United States Patent [19]

Rosenberg et al.

[11] 4,372,586
[45] Feb. 8, 1983

[54] ROD CLAMP PARTICULARLY USEFUL AS PIPE COUPLING

[76] Inventors: Peretz Rosenberg; Avner Rosenberg, both of Moshav Beit Shearim, Israel

[21] Appl. No.: 190,653

[22] Filed: Sep. 25, 1980

[51] Int. Cl.³ .............................................. F16L 21/02
[52] U.S. Cl. ................................... 285/178; 285/369; 285/382; 285/DIG. 22
[58] Field of Search .... 285/178, 382, 369 (U.S. only); 403/350, DIG. 7, DIG. 8

[56] References Cited

U.S. PATENT DOCUMENTS

| | | | |
|---|---|---|---|
| 1,872,048 | 8/1932 | Thomas, Jr. | 285/40 |
| 2,251,253 | 7/1941 | Miller | 285/178 X |
| 3,075,792 | 1/1963 | Franck | 285/178 |
| 3,447,821 | 6/1969 | Bochory | 285/178 |
| 3,984,133 | 10/1976 | Bird | 285/DIG. 22 X |
| 4,298,220 | 11/1981 | Kukuminato | 285/178 |

FOREIGN PATENT DOCUMENTS

| | | | |
|---|---|---|---|
| 1525529 | 11/1969 | Fed. Rep. of Germany | 285/178 |
| 1913395 | 9/1970 | Fed. Rep. of Germany | 285/178 |
| 773626 | 9/1934 | France | 285/178 |

*Primary Examiner*—Thomas F. Callaghan
*Attorney, Agent, or Firm*—Benjamin J. Barish

[57] ABSTRACT

A rod clamp particularly useful as a pipe coupling includes at least two coaxial members with aligned bores adapted to receive the pipe to be coupled, each member having an annular shoulder at least one of which is eccentric such that the members can be rotated with respect to the other to either clamp or release the pipe. In one described embodiment, the two coaxial members are a housing and an end cap, respectively. In a second described embodiment, the coaxial members are a plurality of clamping rings having eccentric openings which are receivable within a housing and are rotated by the housing end cap, the clamping rings being coupled to each other by lost-motion connections such that the more the housing end cap is rotated, the greater the number of clamping rings that become effective to clamp the pipe. A third described embodiment is similar to the first one, except that it includes a clamping ring formed with an eccentric annular shoulder between the housing and end cap and coupled to rotate with the latter.

15 Claims, 10 Drawing Figures

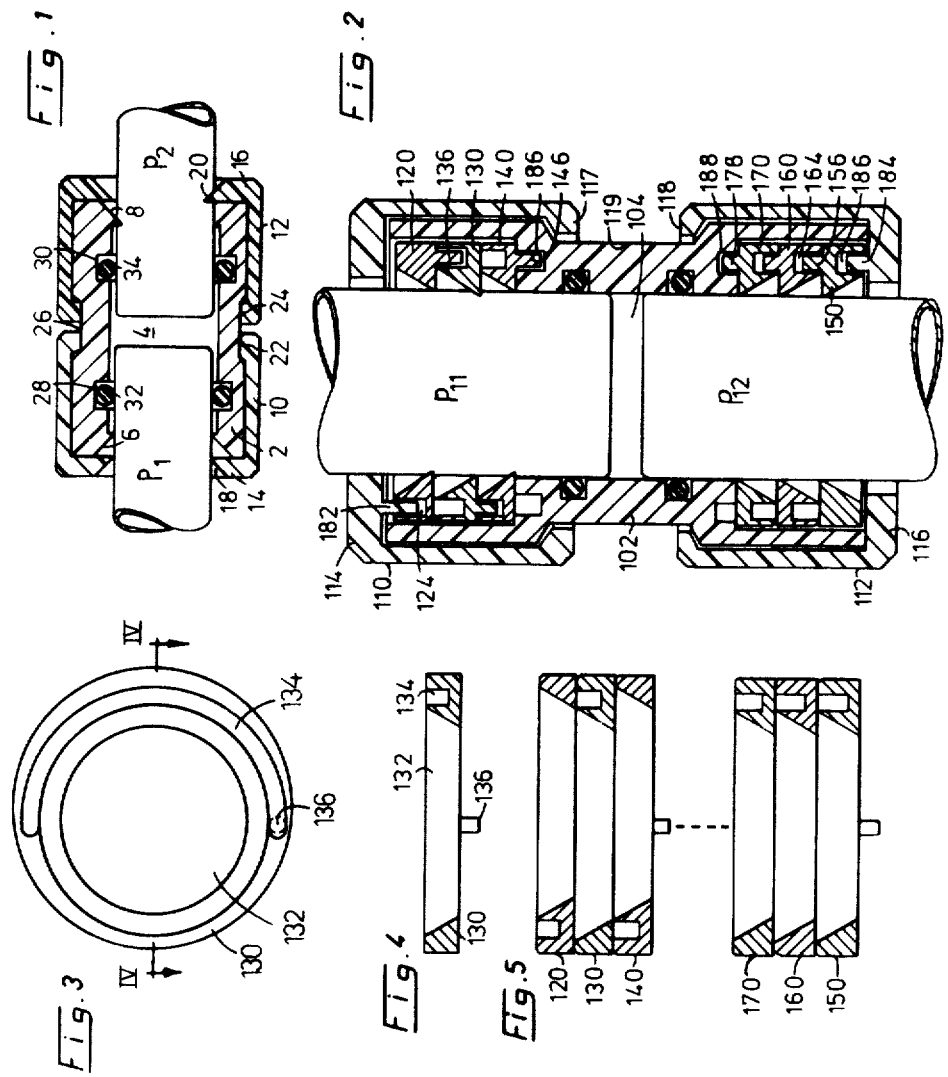

ROD CLAMP PARTICULARLY USEFUL AS PIPE COUPLING

BACKGROUND OF THE INVENTION

The present invention relates to rod clamps particularly useful as pipe couplings, e.g. for coupling a pipe to a fitting, or two pipes together.

Many diverse types of pipe couplings have been devised and are now in use. Nevertheless, new couplings are constantly being developed with the aim to provide one having fewer and simpler parts which can be readily manufactured in volume and at low cost, and which may be manipulated in a simple manner to a clamping position securely clamping the pipe, or to a release position enabling the pipe to be freely inserted or removed therefrom.

An object of the present invention is to provide a new type of rod clamp particularly useful as a pipe coupling and having advantages in the above respects.

BRIEF SUMMARY OF THE INVENTION

According to a broad aspect of the present invention, there is provided a rod clamp particularly useful as a pipe coupling, characterized in that it includes at least two coaxial members formed with aligned bores adapted to receive therethrough a pipe to be coupled with each of these members being further formed with an annular shoulder projecting inwardly of its respective bore and adapted to grip the pipe when inserted therein. At least one of the annular shoulders is eccentric to the axis of its respective member, such that one member may be rotated relative to the other either to a release position wherein the annular shoulders are substantially aligned throughout their circumference, thereby permitting the pipe to be freely inserted and removed from their respective bores, or to a clamping position wherein, due to the eccentricity of the annular shoulder, the pipe is securely gripped between the shoulders of the two members.

The annular shoulders preferably are formed with sharp edges which bite into the pipe when the two members are in their clamping positions.

Three embodiments of the invention are described below for purposes of example.

In one described embodiment, one of the members is a cylindrical housing having an open end formed with an eccentric shoulder for receiving the pipe to be clamped, and the other member is a cap rotatably mounted on the end of the housing and having an end wall formed with an eccentric opening defining its eccentric shoulder for receiving the pipe to be clamped.

In a second described embodiment, the two members are clamping rings rotatably disposed within a housing and formed with eccentric openings whose inner faces constitute their respective eccentric annular shoulder. In the latter described embodiment, the housing further includes an apertured end cap first means coupling the cap to the outer one of the clamping rings for rotating same upon the rotation of the end cap, and second cap couplings means including a lost-motion connection coupling said outer clamping ring to the other clamping ring for rotating same after the outer clamping ring has been rotated one-half revolution. More particularly, the first coupling means comprises a pin projecting inwardly of the housing end cap and receivable in a recess formed in the outer face of the outer clamping ring for rotating same upon the rotation of said end cap; also, the second coupling means between the outer clamping ring and the other clamping ring comprise a pin projecting from the face of one ring receivable in a slot formed in the confronting face of the other ring and extending for one-half the circumference thereof, such that rotation of the housing end cap first effects rotation of the outer clamping ring and then effects rotation of said other clamping ring to securely clamp the pipe between their eccentric openings.

The latter embodiment may include three or more of said clamping rings in stacked relationship with each clamping ring being formed with a pin on one face receivable in a slot in the confronting face of the adjacent clamping rings, the housing further including a slot for receiving the pin of the innermost clamping ring. In such an arrangement, the housing end cap can be rotated several revolutions, depending upon the number of such clamping rings provided, with each half-revolution making another clamping ring effective to clamp the pipe. Accordingly, each pipe coupling can be designed for any particular application by using the same basic parts and including the appropriate number of clamping rings according to the particular application involved.

A third described embodiment is similar to the first one, in that it includes three coaxial members, namely: a cylindrical housing having an open end defining an annular shoulder; a cap rotatably mounted on the latter end of the housing and having an end wall formed with an opening defining an annular shoulder; and a clamping ring having an eccentric annular shoulder, the ring being disposed between the housing end cap shoulders and coupled to the cap so as to be rotated therewith to either its clamping or release positions.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view illustrating one form of pipe coupling constructed in accordance with the invention, the coupling showing one (the right) pipe being clamped, and the other (left) pipe released;

FIG. 2 is a longitudinal sectional view illustrating another form of pipe coupling constructed in accordance with the invention, the upper pipe being clamped and the lowermost pipe being released;

FIG. 3 is an end view illustrating one of the clamping rings used in the pipe coupling of FIG. 2;

FIG. 4 is a sectional view along the sectional line IV—IV of FIG. 3;

FIG. 5 is a sectional view of the two groups of clamping rings of FIG. 4, the upper group being shown in their clamping positions and the lower group being shown in their released positions;

DESCRIPTION OF PREFERRED EMBODIMENTS

Figure 7:
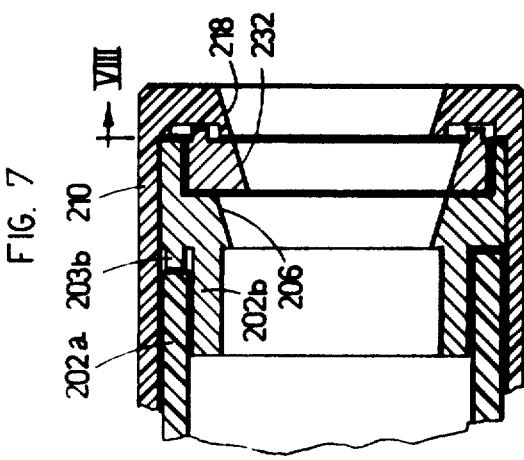
FIGS. 6-9 illustrate a third form of pipe coupling constructed in accordance with the present invention, FIGS. 6 and 7 being longitudinal sectional views illustrating the coupling in its clamping and released positions, respectively, FIG. 8 being a sectional view along lines VIII—VIII of FIG. 7, and FIG. 9 being an end view of the clamping ring in this coupling.
Figure 8:
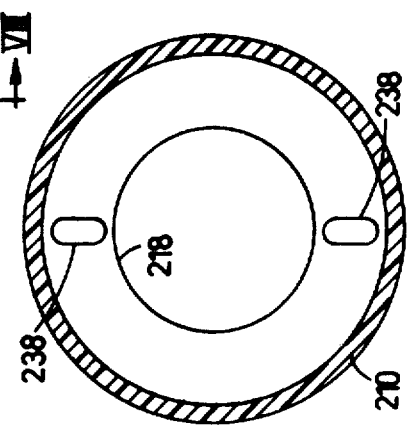

FIG. 1 illustrates a simple in-line coupling for coupling together two fluid-carrying pipes $P_1$ and $P_2$. The coupling includes a cylindrical housing 2 formed with an axial bore 4 eccentric with respect to the axis of the housing, as indicated in FIG. 1 by the upper section of the housing being thicker than the lower section. The outer ends of bore 4 are formed with annular shoulders 6 and 8, respectively, projecting inwardly of the bore, and therefore also eccentric to the axis of the housing 2. The inner edges of the two annular shoulders 6 and 8 are preferably sharpened, as illustrated in FIG. 1.

An end cap 10, 12, is applied over each of the open ends of the housing 2. Each end cap includes an end wall 14, 16 formed with an opening therethrough for receiving the respective pipe $P_1$, $P_2$. These openings through the end walls 14, 16 are eccentric with respect to the axis of the end caps, so that the inner surfaces of the end caps defining these openings also constitute annular shoulders projecting inwardly and eccentric to the axis of the respective end cap. These inner surfaces are also sharpened, as shown at 18 and 20, respectively, in FIG. 1.

The opposite ends of the two end caps 10, 12 are formed with inwardly-directed annular flanges 22, 24 which are received within an annular recess 26 formed centrally of the outer face of housing 2. Thus, the flanges 22, 24 received within recess 26 permit end caps 10, 12 to be rotated relative to housing 2, but do not permit axial movement of the end caps with respect to the housing.

The inner face of housing 2 is further formed with an annular recess 28, 30, adjacent to each of its two open ends. These recesses receive sealing rings 32, 34, engageable with the outer faces of the pipes $P_1$, $P_2$ when inserted into the housing.

The coupling illustrated in FIG. 1 may be used in the following manner.

In order to insert a pipe, e.g. $P_1$ into the coupling, the end cap 10, at that end of the coupling, is rotated so as to substantially align its eccentric annular shoulder 18 with the eccentric shoulder 6 in the housing 2. This is the released position of the end cap with respect to the housing, as illustrated by end cap 14 at the left side of FIG. 1 and permits its respective pipe ($P_1$) to be freely inserted into the bore 4 of the housing.

To clamp the pipe within the housing, the end cap is rotated, whereby the eccentricities with respect to the annular shoulders formed on the housing and an end cap, respectively, oppose each other, thereby causing the sharp edges formed on the eccentric annular shoulders of these members to bite into the pipe. The end cap 12 at the right side of the coupling illustrated in FIG. 1 is shown in its clamping position with respect to the housing 2, wherein it will be seen that pipe $P_2$ is securely clamped between the sharp edge of the housing eccentric flange 8, and the sharp edge 20 of the end cap 12. To remove the pipe, it is only necessary to rotate the respective end cap in the opposite direction, to the position shown at the left side of FIG. 1, thereby re-aligning the eccentric annular shoulders of the housing and end cap which permits the respective pipe to be freely withdrawn from the coupling.

FIGS. 2-4 illustrate a more sophisticated pipe coupling constructed in accordance with the invention, which coupling not only permits a more secure clamping of the pipe to be effected, but also enables the gripping of the clamp to be varied according to the number of clamping rings included in the device and/or the amount one coupling member is rotated with respect to the housing. Broadly speaking, in the arrangement illustrated in FIGS. 2-4, the clamping action is effected by a plurality (three being shown) of clamping rings, each having eccentric openings defining the eccentric annular shoulders which grip the pipe.

More particularly, the pipe coupling illustrated in FIGS. 2-4 includes a housing 102 having an axially extending bore 104 for receiving a pipe $P_{11}$, $P_{12}$ through each of its opposite open ends. The coupling of FIG. 2 further includes an end cap 110, 112, rotatably received at each of the opposite ends of the housing, each cap including an end wall 114, 116 formed with a central opening through which the respective pipe $P_{11}$, $P_{12}$ is passed into the housing. The two end caps 110, 112 are further formed at their inner ends with inwardly directed flanges 117, 118, received within an annular recess 119 formed on the outer face of the housing 102 to permit rotational, but not axial, movement of the end caps with respect to the housing.

A first group of three clamping rings 120, 130, 140 are disposed within the housing 102 at the end receiving the end cap 114, and another group of three clamping rings 150, 160, 170 are disposed within the housing at the opposite end receiving end cap 112.

FIGS. 3 and 4 illustrate the construction of one of the above clamping rings, this being the intermediate ring 130. The others may have the same construction except that the outermost rings 120 and 150 may be modified, as will be described more particularly below.

As can be seen in FIGS. 3 and 4, clamping ring 130 is formed with an eccentric bore 132, this being clear from the illustration of the section of the ring to the right of the bore as thicker than the section to the left of the bore. Clamping ring 130 is further formed with a slot 134, extending for one-half of its circumference in its upper face at the right side of bore 132, and with a pin 136 depending from its opposite face and located at one end of slot 134.

In addition, each of the end caps 110, 112 includes a pin 182, 184, projecting inwardly from its inner face for co-operation with the respective outermost clamping ring 120, 150. These outermost clamping rings are formed merely with a recess or socket 124, 154, respectively, instead of a semi-circular slot (e.g., slot 134 in clamping ring 130) for receiving these pins from the end caps. In addition, each side of the housing 102 is formed with a semi-circular slot 186, 188 for receiving the pins 146, 176, respectively of the innermost clamping rings 140, 170.

The pipe coupling illustrated in FIG. 2 is used in the following manner.

First, assuming the respective end of the pipe coupling is in its open or released position, a pipe may be inserted into the housing through the opening in the respective end cap. The lower end of housing 102 illustrates the above part in released condition, permitting pipe $P_{12}$ to be inserted through the opening in end cap 116 and into the lower end of the housing.

Now, in order to effect the clamping of the pipe within the housing, the respective end cap 116 is rotated. For its first one-half revolution, its pin 184 received within recess 186 of the outermost clamping ring 150, rotates that clamping ring one-half revolution which, due to its eccentricity, causes its inner edge to bite into the outer face of pipe P₁₂. During this first one-half rotation of end cap 116 and clamping ring 150, the next clamping ring 160 is not rotated because of the lost-motion connection between the two, in which the pin 156 of clamping ring 150 rides within the semi-circular slot 164 of clamping ring 160. At the end of the first one-half revolution pin 156 engages the end of the slot 164, and then begins to rotate clamping ring 160. At the end of the second one-half revolution, pin 166 of clamping ring 160 engages the end of slot 174 in the innermost clamping ring 170, rotates that clamping ring during the third one-half revolution, this being permitted by pin 176 of ring 170 moving within the semi-circular slot 188 within the housing 104. This third one-half revolution, and the complete clamping operation, is terminated when pin 174 of the innermost ring 170 abuts against the end of slot 188 in the housing.

The foregoing operation will be clearer from FIG. 5, which illustrates the upper group of rings 120, 130, 140 in their clamping positions and the lower group of rings 150, 160, 170 in their release positions. Thus, it will be seen that the eccentricities of all the rings 150, 160, 170 of the lower group are aligned, whereby the pipe (P₁₂ in FIG. 2) may be freely inserted or withdrawn from the coupling housing 104. During the first one-half revolution of the end cap, only the outer ring moves so that its eccentric opening becomes non-aligned with those of the other two rings during the second one-half revolution of the end cap, the outer ring moves with the intermediate ring so that the eccentric opening in the outer ring becomes aligned with that of the inner, but the eccentric opening of the intermediate ring becomes non-aligned with those of the other two rings; and during the third one-half revolution, all three rings move so that the outer ring opening remains aligned with the inner one, both of which are non-aligned with the intermediate one. This is the condition illustrated in the upper group of three clamping rings 120, 130, 140 in FIG. 5.

In order to release the pipe the respective end cap is rotated in the opposite direction, thereby causing each of the clamping rings, successively, to be rotated one-half revolution to their released positions, thereby releasing the pipe for withdrawal from the coupling.

It will thus be seen that the embodiment illustrated in FIG. 2 may be designed to provide as many gripping points along the length of the pipe to be clamped, as desired, by that number of clamping rings provided and the number of rotations of the end cap. It will also be seen that the semi-circular slots 186, 188 in the housing could be merely cylindrical holes or recesses for accommodating the respective pins, and that the holes or recesses 124 and 184 in the outer faces of the outermost rings 120, 150 could be semi-circular slots for the sake of identity in construction of all the clamping rings.

Figure 6:
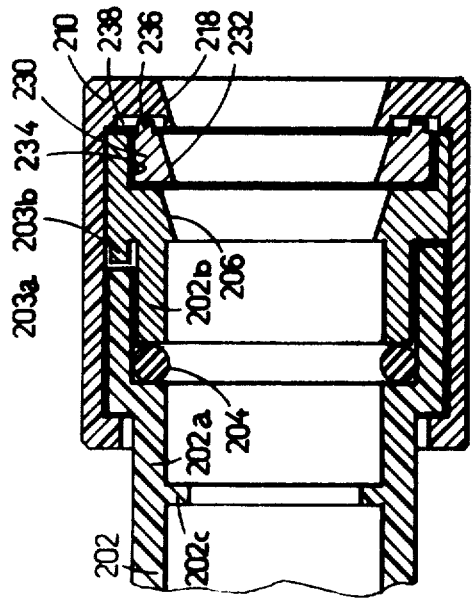
Figure 9:
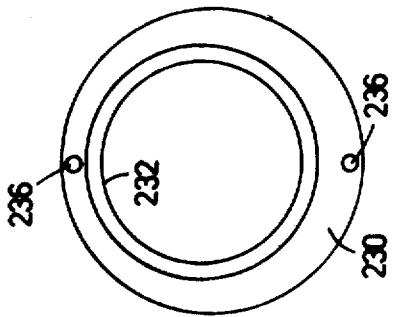

The embodiment illustrated in FIGS. 6–9 is somewhat similar to that of FIG. 1, in that it includes a cylindrical housing 202 formed with an axial bore 4, and an end cap 210 at both ends of the housing, only one end being illustrated in FIGS. 6 and 7. In this embodiment, housing 202 is constituted of two cylindrical sections, namely a main section 202a and an end section 202b. The main section 202a is formed with a recess 203a receiving a pin 203b formed on the confronting face of the end section 202b to prevent relative rotational movement between the two housing sections. These two sections define the annular recess for receiving the sealing ring 204. An internal annular shoulder 202c is joined integrally with housing section 202a and serves as a stop engageably with the pipe end when inserted into the housing.

The housing end section 202b is formed with the sharp-edge annular shoulder 206b adapted to bite into the pipe (not shown) when inserted into the housing. In addition, cap 210 is also formed with a sharp-edge annular 218 for biting into the pipe. In the embodiment of FIGS. 6–9, both of the annular shoulders 206 and 218 are eccentric to the longitudinal axis of the coupling.

Interposed between the two annular shoulders 206 and 218 is a clamping ring 230 formed with an axial bore to define a sharp-edge annular shoulder 232, which annular shoulder is eccentric with respect to the axis of ring 230. Ring 230 is received within an annular recess 234 formed in the outer face of the housing end section 202b, which annular recess is also eccentric with respect to the axis of the housing. The opposite (i.e., outer) face of clamping ring 230 is formed with a pair of pins 236 extending in the axial direction at diametrically-opposed locations of the clampng ring 230, which pins 236 are received within slots 238 formed on the inner face of the clamping ring 210. The latter slots 238 are extended in the radial direction, as shown particularly in FIG. 8, so as to accommodate the pins 236 during the radial displacement of the clamping ring 230 when it is moved to its clamping and released positions, as will be described below.

FIG. 6 illustrates the coupling in its released position, wherein it will be seen that clamping ring 230 is located such that its sharp-edge annular shoulder 232 is aligned with the other two sharp-edge annular shoulders 206 and 218 around their complete circumferences. Accordingly, the pipe may be freely inserted or removed from the coupling.

To move the coupling to its clamping position, cap 210 is rotated, which thereby rotates the clamping ring 230. Because of the eccentricity of the annular recess 234 within which clamping ring 230 rotates, and also the eccentricity of the sharp-edge annular shoulder 232 of the clamping ring 230, it will be seen that the latter annular shoulder is rotated so that it moves radially inwardly at one side of the two annular shoulders 206 and 218, and radially outwardly on the opposite side. Thus, the coupling provides a firm gripping of the pipe at three axially spaced locations to thereby securely hold the pipe when the coupling is in its clamping position.

To release the pipe, it is only necessary to rotate cap 210 in the opposite direction so as to bring the parts to the position illustrated in FIG. 6, with annular shoulder 232 of the clamping ring 230 in alignment with the other two annular shoulders 206 and 218 around their complete circumferences, whereby the pipe is released for removal or insertion into the coupling.

While the housing 202 is illustrated in FIGS. 6 and 7 as being made of two sections, namely, sections 202a and 202b, it will be appreciated that the housing could be made of a single section. The illustrated two-section construction is simpler to manufacture, and also simpler to assemble in that the sealing ring 234 may be inserted in a convenient manner before inserting the outer housing section 202b.

Figure 10:
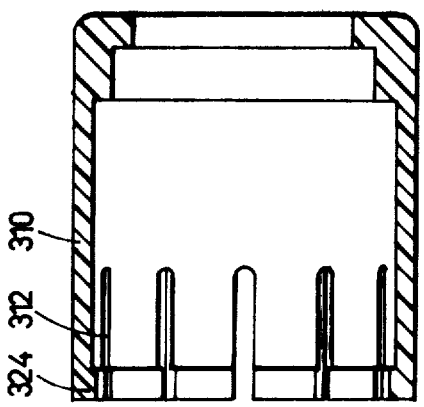
FIG. 10 is a sectional view illustrating a cap construction that can be used in all three of the above embodiments.

FIG. 10 illustrates a cap 310 formed with a plurality of axial slits 312 at the end thereof having the annular flange 324 received within the annular recess (e.g., recess 26 in FIG. 1) of the housing to permit rotation, but not axial movement, of the end cap with respect to the housing. Providing the end cap 310 with the axial slits 312 increases the resiliency of that end of the cap, and thereby facilitates the application and removal of the cap to the housing. It will be appreciated that such a cap construction, as illustrated in FIG. 2, may be used for all of the above-described embodiments.

Many other variations, modifications and applications of the invention may be made.

What is claimed is:

1. A rod clamping device particularly useful as a pipe coupling characterized in that it includes: at least two coaxial members formed with aligned bores adapted to receive therethrough a pipe to be coupled; each of said members being further formed with an annular shoulder projecting inwardly of its respective bore and adapted to grip the pipe when inserted therein; at least one of said annular shoulders being eccentric to the axis of its respective member such that one of said members may be rotated relative to the other either to a release position wherein said annular shoulders are substantially aligned throughout their circumferences thereby permitting the pipe to be freely inserted and removed from their respective bores, or to a clamping position wherein due to the eccentricity of said at least one annular shoulder, the pipe is securely gripped between the shoulders of the two members; said annular shoulders including hard, sharp edges which bite into the pipe when the members are in their clamping positions.

2. A device according to claim 1, wherein one of said members is a cylindrical housing having an open end defining an annular shoulder for receiving the pipe to be clamped, and the other of said members is a cap rotatably mounted on said end of the housing and having an end wall formed with an opening defining an annular shoulder for receiving the pipe to be clamped, at least one of said annular shoulders being eccentric to the axis of its respective member.

3. A device according to claim 2, wherein said housing is open at both ends and is formed at both ends with an eccentric shoulder for receiving two pipes to be clamped together, there being a cap rotatably mounted on each end of the housing, each cap having an end wall formed with an eccentric opening for receiving the respective pipe to be clamped.

4. A device according to claim 1, wherein said two members are clamping rings rotatably disposed within a housing and formed with eccentric openings whose inner faces constitute the eccentric annular shoulders.

5. A device according to claim 4, wherein said housing further includes an apertured end cap, first coupling means coupling said cap to the outer one of said clamping rings for rotating same upon the rotation of said clamp, and second coupling means including a lost-motion connection coupling said outer clamping ring to the other clamping ring for rotating same after the outer clamping ring has been rotated one-half revolution.

6. A device according to claim 5, wherein said first coupling means comprises a pin projecting inwardly of the housing end cap and receivable in a recess formed in the outer face of the outer clamping ring for rotating same upon rotation of the end cap.

7. A device according to claim 5, wherein said second coupling means between the outer clamping ring and the other clamping ring comprises a pin projecting from the face of one ring receivable in a slot formed in the confronting face of the other ring and extending for one-half the circumference thereof, such that rotation of the housing end cap first effects rotation of the outer clamping ring and then effects rotation of said other clamping ring to securely clamp the pipe between their eccentric openings.

8. A device according to claim 4, wherein there are at least three of said clamping rings in stacked relationship with each clamping ring being formed with a pin on one face receivable in a slot in the confronting face of the adjacent clamping ring, the housing further including a slot for receiving the pin of the innermost clamping ring.

9. A device according to claim 1, wherein there are at least three of said coaxial members, one of said members being a cylindrical housing having an open end defining an annular shoulder, the second being a cap rotatably mounted on said end of the housing and having an end wall formed with an opening defining an annular shoulder, and the third being a clamping ring having an eccentric annular shoulder disposed between the housing end cap shoulders and coupled to said cap so as to be rotated therewith to either said clamping position or release position.

10. A device according to claim 9, wherein said ring is coupled to said cap by means of a pin carried by one receivable in a slot formed in the other which slot is radially extended to accommodate the radial placement of said clamping ring.

11. A device according to claim 10, wherein there are a plurality of pins projecting axially from the outer face of said clamping ring receivable in a plurality of slots formed in the inner face of said cap and extended in the radial direction.

12. A device according to claim 9, wherein said housing includes a cylindrical main section and a cylindrical end section coaxial thereto, the two sections including enterengaging surfaces preventing relative rotation therebetween, said annular shoulder of the housing being formed on its said end section.

13. A device according to claim 2, further including a sealing ring received within said cylindrical housing for engagement with the outer face of the pipe to be clamped.

14. A device according to claim 2, wherein said housing is formed on its outer face with an annular recess spaced from its open end, and said cap is formed with an annular flange at its end opposite to its annular shoulder, which annular flange is received within said annular recess of the housing for permitting rotational, but not axial, movement of the cap with respect to the housing.

15. A device according to claim 14, wherein said opposite end of the cap is formed with axially-extending slits to increase the resiliency thereof and thereby to facilitate the application and removal of the cap with respect to said housing.

* * * * *